United States Patent [19]

Yoshikawa

[11] Patent Number: 4,649,262

[45] Date of Patent: Mar. 10, 1987

[54] HEATING CYLINDER DEVICE FOR A MOLDING MACHINE

[75] Inventor: Norio Yoshikawa, Kyoto, Japan

[73] Assignee: Omron Tateisi Electronics Co., Kyoto, Japan

[21] Appl. No.: 694,151

[22] Filed: Jan. 23, 1985

[30] Foreign Application Priority Data

| Jan. 23, 1984 | [JP] | Japan | 59-10760 |
| Mar. 13, 1984 | [JP] | Japan | 59-35463[U] |
| Mar. 14, 1984 | [JP] | Japan | 59-36547[U] |
| Mar. 15, 1984 | [JP] | Japan | 59-37158[U] |

[51] Int. Cl.$^4$ ............................................. F27B 14/06
[52] U.S. Cl. .................................... 219/421; 219/424; 425/144
[58] Field of Search ............... 219/214, 388, 421, 424, 219/521; 165/87; 222/146.5; 425/549, 143, 144, 145

[56] References Cited

U.S. PATENT DOCUMENTS

| 3,119,148 | 1/1964 | Chambers | 425/143 |
| 3,753,661 | 8/1973 | Simons | 425/143 |
| 4,015,916 | 4/1977 | Sokolow | 425/549 |
| 4,197,070 | 4/1980 | Koschmann | 425/143 |
| 4,238,671 | 12/1980 | Gellert | 219/421 |
| 4,268,241 | 5/1981 | Rees | 425/549 |
| 4,478,780 | 10/1984 | Kim | 425/549 |
| 4,479,048 | 10/1984 | Kinoshita | 219/338 |
| 4,480,981 | 11/1984 | Togawa | 425/143 |
| 4,514,160 | 4/1985 | Davidsmeyer | 425/549 |
| 4,548,341 | 10/1985 | Hambleton | 425/143 |

FOREIGN PATENT DOCUMENTS

1167008 4/1964 Fed. Rep. of Germany .
1572514 7/1980 United Kingdom .

OTHER PUBLICATIONS

Die Technick des Strangpressens, Jean Peynichou ("Industries des Plastiques Modernes", Paris), 1958, vol. I, pp. 9-11.

Primary Examiner—E. A. Goldberg
Assistant Examiner—Teresa J. Walberg
Attorney, Agent, or Firm—Stevens, Davis, Miller & Mosher

[57] ABSTRACT

This heating cylinder device for a molding machine includes a cylinder member along the axial direction of which and within which are defined several heating zones for material to be molded, each of the heating zones being provided with a heater, wherein the heating capacities and the thermal conductivities to the exterior of the heating zones are suitably arranged so as to correspond to the temperatures and operational performances required from the heating zones. Each of the heaters may optionally surround the portion of the cylinder member defining its heating zone. The external diameter of the portion of the cylinder member defining each of the heating zones may be varied according to the heat capacity and temperature required therefrom; or, the portions of the cylinder member between its portions defining the heating zones may be substantially narrowed down as compared to its portions defining the heating zones; or, each of the heaters may be buried in the portion of the cylinder member defining its heating zone; or, a plurality of layers of insulating material may be provided as surrounding a plurality of the heating zones and the heaters surrounding them. In the last case, these layers may be of different thicknesses.

10 Claims, 7 Drawing Figures

HEATING CYLINDER DEVICE FOR A MOLDING MACHINE

BACKGROUND OF THE INVENTION

The present invention relates to a heating cylinder device for melting resin material in a molding machine such as an injection molding machine or an extruder or the like which performs mold forming using such resin as a material, and in particular to such a heating cylinder device which can more effectively accomplish steady and uniform heating up of such resin material.

In the prior art with regard to this sort of heating cylinder device for a molding machine, demands are nowadays constantly being made for shortening of the injection cycle, in order to improve productivity. Further, it is also very desirable to reduce the power consumption of the heating means for the resin, which typically accounts for about a third of the total power consumption of the injection molding machine. Reduction of the power required for setting up the machine and bringing its various parts to appropriate operating temperatures is effective for meeting this end. And yet further it is a constant requirement to improve the precision of the molded products made by the molding machine, which entails as accurate control of heating of the resin material as possible. Accordingly, proper heat management of the heating cylinder device for the resin is crucial for meeting these needs.

Now, in the prior art, such a heating cylinder device typically has had a plurality of heating zones arranged, and has basically been shaped as a uniform hollow cylinder, with a plurality of annular band shaped heaters arranged longitudinally around its outer surface along the lengthwise direction, each such heater being wrapped around one of the heating zones. These heaters are energized in such appropriate amounts as to keep the successive heating zones at appropriate temperatures to ensure proper heating up of the resin material to be molded, as such resin material is progressively moved down along the central hole of the hollow heating cylinder device by the action of a plunger or the like. Thus, the heat management for these heating zones is performed.

However, the problems with such a prior art type of heating cylinder device are as follows.

First, because the thickness of the heating cylinder has been uniform for each of the heating zones, thermal interferences tend to develop between neighboring ones of the heating zones, in addition to the interferences arising from external sources such as changes in the ambient temperature, fluctuations in the system due to the motion of the resin material which is being heated up, changes in the temperature of the resin material, dissipation of heat in injecting the resin material, and so on. Accordingly accurate temperature control of the resin becomes very difficult. Further, because the thickness of the heating cylinder has been uniform for each of the heating zones, each of these heating zones has approximately the same heat capacity, and in view of the different temperatures up to which these zones are required to be heated this causes difficulties in heating control.

Secondly, because each heating zone as defined along the axis of the heating cylinder device is contiguous to the next, and the heating cylinder device is constructed basically as a uniform hollow cylinder, the abovementioned thermal interferences which tend to develop between neighboring ones of the heating zones are very strong, and present a substantial obstacle to the proper heat control of the various heating zones.

Thirdly, because the thickness of the walls of the heating cylinder device, in other words the distance between its outer circumferential surface on which, in the above outlined prior art, the band shaped heaters are mounted, and its inner hole in which the resin is flowing, is very substantial, a time delay occurs in the transfer of heat from the heaters to the resin, and accordingly precise temperature control of the resin becomes very difficult, and fluctuations in the system, such as alterations in the ambient temperature, changes in the flow speed of the resin and in the temperature at which said resin is supplied to the heating cylinder device, and changes in the dissipation of heat that occurs when injecting the resin, cause great problems with regard to temperature control, because of the lack of responsiveness of the system.

Fourthly and lastly, because the thermal capacity of each of the heating zones is approximately the same, and because the resistance to heat flow from each of the heating zones to the outside is approximately the same, this further causes thermal interferences between the neighboring heating zones to occur.

SUMMARY OF THE INVENTION

Accordingly, it is the primary object of the present invention to provide a heating cylinder device for a molding machine which avoids the above outlined disadvantages.

It is a further object of the present invention to provide such a heating cylinder device for a molding machine which can keep the injection cycle of the machine short.

It is a further object of the present invention to provide such a heating cylinder device for a molding machine which can improve productivity of the machine.

It is a further object of the present invention to provide such a heating cylinder device for a molding machine which reduces the power consumption as much as practicable.

It is a further object of the present invention to provide such a heating cylinder device for a molding machine which reduces operational cost.

It is a further object of the present invention to provide such a heating cylinder device for a molding machine which reduces the cost of the finished products.

It is a further object of the present invention to provide such a heating cylinder device for a molding machine which can improve the temperature control of the resin.

It is a further object of the present invention to provide such a heating cylinder device for a molding machine which can improve the responsiveness of the temperature control.

It is a yet further object of the present invention to provide such a heating cylinder device for a molding machine which promotes the production of more precise finished molded products.

It is a yet further object of the present invention to provide such a heating cylinder device for a molding machine which provides proper heat management.

It is a yet further object of the present invention to provide such a heating cylinder device for a molding machine which keeps the thermal interference between neighboring ones of heating zones thereof as low as possible.

It is a yet further object of the present invention to provide such a heating cylinder device for a molding machine which keeps the thermal interference from outside sources as low as possible.

It is a yet further object of the present invention to provide such a heating cylinder device for a molding machine which minimizes fluctuations in the system due to the motion of the resin material which is being heated up, changes in the temperature of the resin material, dissipation of heat in injecting the resin material, and so on.

According to the most general aspect of the present invention, these and other objects are accomplished by a heating cylinder device for a molding machine, comprising a cylinder member along the axial direction of which and within which are defined a plurality of heating zones for material to be molded, each of said heating zones being provided with a heater, wherein the heating capacities and the thermal conductivities to the exterior of said heating zones are suitably arranged so as to correspond to the temperatures and operational performances required from said heating zones.

According to such a structure, as will be particularly explained with regard to particular embodiments of the present invention, there is provided a heating cylinder device for a molding machine which can keep the injection cycle of the machine short, thus improving the productivity of the machine and reducing the cost of operation and the cost of the finished products. Further, the power consumption is reduced as much as practicable, and the temperature control of the resin is improved, and the responsiveness of the temperature control is also improved. Thus, this heating cylinder device for a molding machine minimizes fluctuations in the system due to the motion of the resin material which is being heated up, changes in the temperature of the resin material, dissipation of heat in injecting the resin material, and so on. Thereby, this heating cylinder device for a molding machine promotes the production of more precise finished molded products, by providing proper heat management by keeping the thermal interference between neighboring ones of heating zones thereof as low as possible, as well as by keeping the thermal interference from outside sources as low as possible.

As a useful specialization of the above defined concept, these and other objects are yet more particularly and concretely accomplished by a heating cylinder device as described above, wherein each of said heaters surrounds the portion of said cylinder member defining its said heating zone.

Further, according to one particular constructional aspect of the present invention, these and other objects may be more particularly and concretely accomplished by a heating cylinder device of either of the types described above, wherein the external diameter of the portion of said cylinder member defining each of said heating zones is varied according to the heat capacity and temperature required therefrom; or, according to another particular constructional aspect of the present invention, these and other objects may be more particularly and concretely accomplished by a heating cylinder device of either of the types described above, wherein the portions of said cylinder member between its said portions defining said heating zones are substantially narrowed down as compared to its said portions defining said heating zones; or, according to another particular constructional aspect of the present invention, these and other objects may be more particularly and concretely accomplished by a heating cylinder device of either of the types described above, wherein each of said heaters is buried in the portion of said cylinder member defining its said heating zone; or, according to yet another particular constructional aspect of the present invention, these and other objects may be more particularly and concretely accomplished by a heating cylinder device of either of the types described above, further comprising one or a plurality of layers of insulating material surrounding one or a plurality of said heating zones and said heaters surrounding them.

According to these various particular structural concepts, the present invention may be concretely realized in an appropriate form for the particular application.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENT

Figure 1:
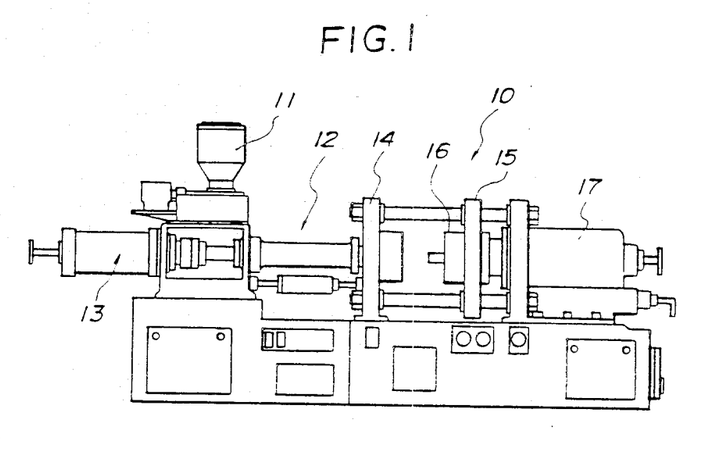
FIG. 1 is a side view of an injection molding machine incorporating a schematic heating cylinder device according to the present invention, this figure being applicable to any of the four preferred embodiments of the present invention which will be disclosed herein.

The present invention will now be described with reference to the preferred embodiments thereof, and with reference to the appended drawings. FIG. 1 is a side view of an injection molding machine, denoted generally by the reference numeral 10, which is for molding resin, and which incorporates a heating cylinder device 12 according to the present invention which may be one according to the first preferred embodiment of the present invention. In more detail, the injection molding machine 10 comprises a hopper 11 for charging the resin, the aforementioned heating cylinder device 12, a screw drive device 13 for rotatively driving a screw piston 20 incorporated in said heating cylinder device 12 which will be described later for injecting the molten resin, and a movable plate drive device 17 for removing the molded products by opening and closing a metallic die 16 which is mounted between a fixed plate 14 and a laterally movable plate 15.

Figure 2:
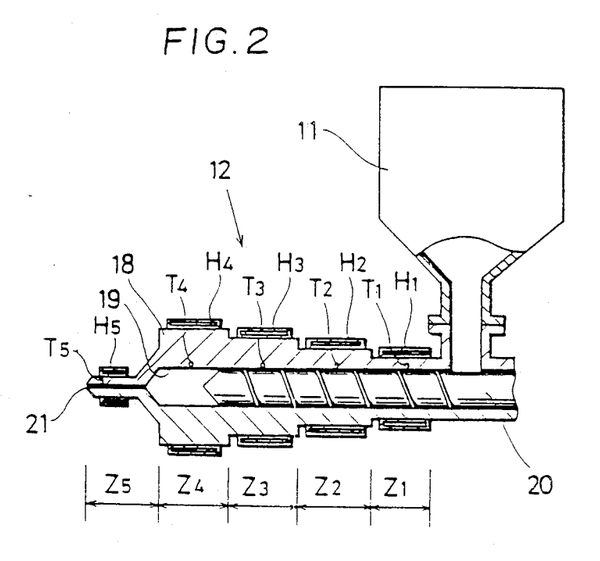
FIG. 2 is a sectional view through a heating cylinder device, such as may be fitted to the injection molding machine of FIG. 1, according to a first preferred embodiment of the present invention, taken in a sectional plane containing the axis of said heating cylinder device.

In FIG. 2, there is shown a sectional view of this heating cylinder device 12 according to the first preferred embodiment of the present invention, taken in a sectional plane containing the axis of said heating cylinder device. The device 12 is generally formed in a cylindrical shape with a central axial hole 19 formed through a cylinder wall portion 18, and a screw piston 20 mentioned above is fitted in said central axial hole 19, so as when rotated in a certain direction by the aforementioned screw drive device 13 to move to the left in the figure into said hole 19 so as to apply compression force to resin in said hole 19, and so as when rotated in the opposite direction to said certain direction to be moved to the right in the figure and to be withdrawn out of said hole 19. When said screw piston 20 is thus withdrawn from the hole 19 to a position beyond a given position, resin charged in the hopper 11 can travel downwards into the hole 19 to recharge the heating cylinder device 12. A nozzle 21 is provided at the opposite end (the left end) of the heating cylinder device 12 from the hopper 11 (which is at the right end). Thus, as the screw piston 20 is alternately rotated in said certain direction and in the opposite direction to said certain direction, it is alternately forced into the hole 19 and withdrawn therefrom, thus alternately compressing resin in said hole 19 and forcing it out through the nozzle 21, and recharging said hole 19 with fresh resin from the hopper 11.

In the heating cylinder device 12, there are altogether defined five heating zones, designated as Z1 through Z5, and axially spaced along the axis of said heating cylinder device 12 from the right to the left as seen in FIG. 2, i.e. from the end thereof at which the hopper 12 is provided to the end thereof at which the nozzle 21 is provided. Around each of these heating zones Z1 through Z5 there is fitted a corresponding heater H1 through H5, which is formed as a band extending right around the cylinder of the heating cylinder device 12, and in the inner wall portion of the heating cylinder device 12, in each of said heating zones Z1 through Z5, there is fitted a corresponding thermocouple T1 through T5.

In detail, the first heating zone Z1 is the portion of the heating cylinder device 12 into which the resin is supplied from the hopper 11, and is heated by the heater H1 and is also water cooled so that the resin may be supplied from the hopper 11 without any risk of its surface being melted. And the thermocouple T1 detects the temperature in this first heating zone Z1. The second heating zone Z2 is a portion of the heating cylinder device 12 in which the resin is, next, heated up substantially only by the heater H2, and the thermocouple T2 detects the temperature in this second heating zone Z2. The third heating zone Z3 is a portion of the heating cylinder device 12 in which the resin is, next, heated up both by the heater H3 and by the frictional heat generated by the rotation of and by the compression effect generated by the screw piston 20; and the thermocouple T3 detects the temperature in this third heating zone Z3. The fourth heating zone Z4 is a reservoir in which the resin material to be injected is received for a certain time interval before being injected, and is required to be kept at a certain high temperature; in this portion of the heating cylinder device 12, the resin is heated up by the heater H4, and the thermocouple T4 detects the temperature in this fourth heating zone Z4. And the fifth heating zone Z5, which is just before the nozzle 21, is a portion of the heating cylinder device 12 in which the resin is particularly subject to disturbance of its temperature by external influences such as the heat capacity of the metallic die 16 and the atmosphere; and, in order to eliminate such external influence, the resin in this fifth heating zone Z5 is kept hot by the heater H5, and the thermocouple T5 detects the temperature in this fifth heating zone Z5.

Now, particularly according to the particularly specialized inventive concept of this first preferred embodiment of the present invention, the wall portion 18 of the heating cylinder device 12 is structured, not as in the prior art described above as a uniform cylinder of the same inner and outer diameters along its longitudinal length, but with the same inner diameter along its longitudinal length and with an outer diameter which increases in steps from the first heating zone Z1 to the second heating zone Z2, from the second heating zone Z2 to the third heating zone Z3, and from the second heating zone Z3 to the fourth heating zone Z4. And the outer diameter of the wall portion 18 of the heating cylinder device 12 at the fifth heating zone Z5 is much smaller than at all the other heating zones Z1 through Z4. Thus, the portions of the wall portion 18 which define the heating zones Z1 through Z5 are each of thickness appropriate to define a cylinder portion with heat capacity corresponding to the heating temperature required for said heating zone. In other words, the portions of the wall portion 18 of the heating cylinder device 12 which define the first heating zone Z1 and the fifth heating zone Z5 are thin, because the temperature control provided by the heaters H1 and H5 for these two heating zones Z1 and Z5 is required to be transferred very accurately and quickly to the resin, and accordingly the heat capacities of these portions of the wall portion 18 are kept low; while on the other hand the portions of said wall portion 18 of the heating cylinder device 12 which define the second, third, and fourth heating zones Z2 through Z4 are thicker, because heating temperatures required for these heating zones Z2 through Z4 are higher and accordingly it is beneficial to make the heat capacities of these portions of the wall portion 18 greater. In particular, the thickness of the portion of the wall portion 18 which defines the fourth heating zone Z4, which is required to be kept at a certain relatively high temperature, is made the thickest, so as to maximize the heat capacity of this portion of the wall portion 18.

Figure 3:
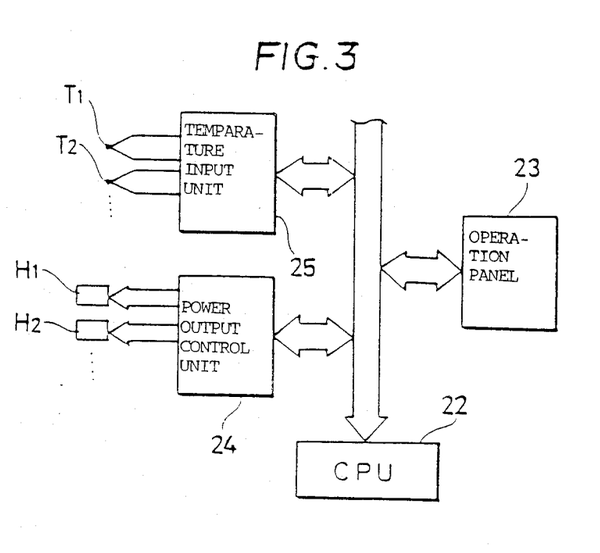
FIG. 3 is a schematic block diagram, showing a possible construction for a control system for the heating control of five heating zones of the heating cylinder device of FIG. 2, including a central processing unit or CPU.

In FIG. 3, there is schematically shown in block diagram form a possible exemplary construction for the control system for the heating control of the five heating zones Z1 through Z5; although this control system does not form part of the present invention in the strict sense, nevertheless it is shown for the purposes of explanation, because its function is relevant. In this figure, the reference numeral 22 denotes a CPU (central processing unit) which via a bus communicates with an operation panel 23, a power output control unit 24, and a temperature input unit 25. The power output control unit receives signals from the CPU 22, and based upon their values controls the supply of power (in an ON and OFF fashion or a fashion of bang bang control) to the five band shaped heaters H1 through H5 for the five heating zones Z1 through Z5 respectively. The temperature input unit 25 receives supply of signals from the five thermocouples T1 through T5 for the five heating zones Z1 through Z5 respectively, and based upon the values of said signals (which are representative of the temperatures in said heating zones Z1 through Z5) outputs signals to the CPU 22. The operation panel 23 allows the setting up of target values for the temperatures for the five heating zones Z1 through Z5 individually, and based upon the values of said set up target values outputs appropriate signals to the CPU 22. CPU 22 operates according to various programs stored in its internal memory to control the aforementioned circuits and others not shown, thereby recording and reading out necessary data and performing calculations of various parameters associated with the temperature control of the five heating zones Z1 through Z5.

Figure 4:
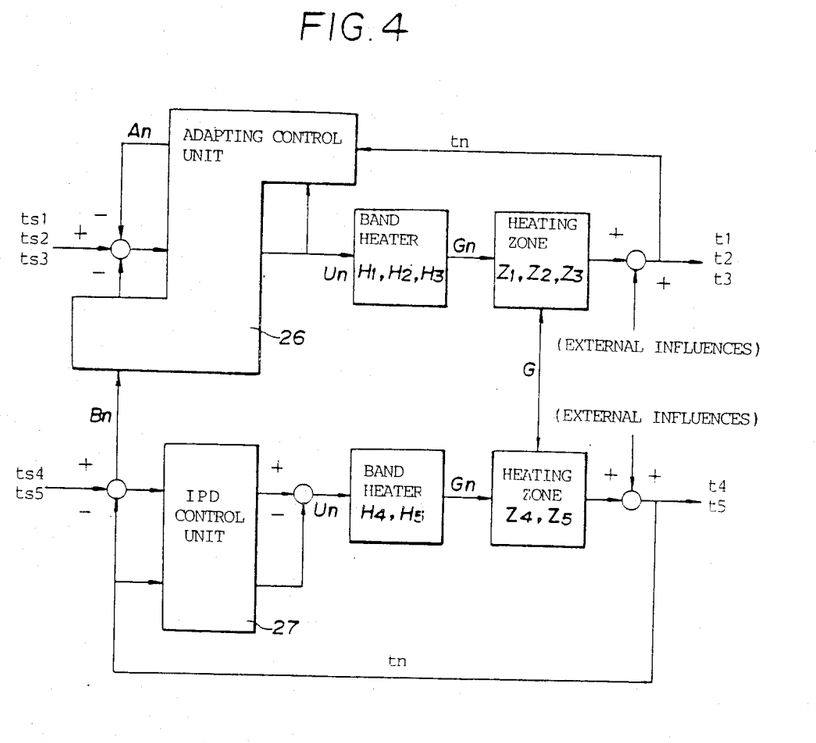
FIG. 4 is a schematic control diagram for showing the processes of temperature control for the five heating zones of the heating cylinder device of FIG. 2 as performed by the CPU of FIG. 3.

In FIG. 4, a schematic control diagram for the temperature control for the heating zones Z1 through Z5 as performed by the CPU 22 is shown. In the case of the shown exemplary construction and operation, which are not intended to be limitative of the present invention, the processes of control of the temperatures of the first through the third heating zones Z1 through Z3 are performed by adaptive control, while on the other hand the processes of control of the temperatures of the fourth and the fifth heating zones Z4 and Z5 are performed by I-PD control.

The reference numeral 26 denotes an adaptive control unit for performing this adaptive control of the temperatures of the first through the third heating zones Z1 through Z3. This adaptive control unit 26 sets up a plurality of parameters for the first through the third heating zones Z1 through Z3, and, when the target values ts1 through ts3 for the temperatures of said first through the third heating zones Z1 through .Z3 are inputted as set up on the operation panel 23, selects the parameters which correspond to these target values ts1 through ts3 so as to perform temperature control of the heating temperatures of the band heaters H1 through H3 with certain manipulated variables Un. The calorific values Gn of the heating zones Z1 through Z3 are detected by the corresponding thermocouples T1 through T3 respectively, or in other words the temperatures of the corresponding parts of the inner wall portion of the wall portion 18 of the heating cylinder device 12 are detected, and the controlled variables tn are inputted into the adaptive control unit 26. But these controlled variables are contaminated by external influences and interferences. Therefore, the adaptive control unit 26 evaluates the parameters according to the manipulated variables Un and the controlled variables tn, or in other words evaluates whether the temperature control is being performed with the optimum parameters among other parameters (because it should be remembered that a plurality of such parameters are prepared in advance); and the evaluated variables An thus prepared are fed back to the adaptive control unit 26 for temperature controlling the heating zones Z1 through Z3 with the optimum parameters.

Thus, by adapting the outer diameter of the wall portion 18 of the heating cylinder device 12 to the particular requirements of each of the three heating zones Z1 through Z3, according to their heat capacities, in other words by reducing the outer diameter of said wall portion 18 in consideration of the desirability of responsiveness of the temperature control, in addition to temperature controlling the respective heating zones Z1 through Z3, the influences of thermal interferences between the heating zones Z1 through Z3 may be largely eliminated, and fluctuations of the temperature of the resin which is to be forwarded to the fourth heating zone Z4 may be kept minimal.

The reference numeral 27 denotes an IP-D control unit for performing the IP-D control of the temperatures of the fourth and fifth heating zones Z4 and Z5. This IP-D control unit 27 is set up with a single parameter for the temperature control of each of the fourth and fifth heating zones Z4 and Z5, and, when the target values ts4 and ts5 for the temperatures of said fourth and fifth heating zones Z4 and Z5 are inputted as set up on the operation panel 23, performs temperature control of the heating temperatures of the band heaters H2 and H5 for these heating zones Z4 and Z5 with the controlled variables Un for each of the parameters. Because the calorific values of the heating zones Z4 and Z5 are detected by the respective thermocouples T4 and T5, and the detected variables tn are subject to some admixture of external influences and interferences, these detected variables tn are fed back to the IP-D control unit 27 for temperature control.

Thus, by adapting the outer diameter of the wall portion 18 of the heating cylinder device 12 to the particular requirement of the fourth heating zone Z4, according to its heat capacity, in other words by increasing the outer diameter of said wall portion 18 in consideration of the desirability of increasing its thermal capacity, in addition to temperature controlling the heating zones Z4 and Z5, the temperature of the resin material to be injected through the nozzle 21 is made uniform and is stabilized at a fixed temperature value, and high precision molding is made possible. As for the thermal interference G between the first through the third heating zones Z1 through Z3 and the fourth and the fifth heating zones Z4 and Z5, it is eliminated by calculating the deviations Bn and by feeding them back to the controller.

Thus, according to the present invention, the thermal interference between the neighboring ones of the heating zones Z1 through Z5 is kept minimal, because the outer diameters of the relevant parts of the wall portion 18 of the heating cylinder device 12 are adapted to the particular requirements of these heating zones Z1 through Z5, so as to provide heating capacities corresponding to the heating temperatures of the zones Z1 through Z5.

Thus, according to this first preferred embodiment of the present invention, there is provided a heating cylinder device for a molding machine which can keep the injection cycle of the machine short, thus improving the productivity of the machine and reduces the cost of operation and thus the cost of the finished products. Further, the power consumption is reduced as much as practicable, and the temperature control of the resin is improved, and the responsiveness of the temperature control is also improved. Thus, this heating cylinder device for a molding machine minimizes fluctuations in the system due to the motion of the resin material which is being heated up, changes in the temperature of the resin material, dissipation of heat in injecting the resin material, and so on. Thereby, this heating cylinder device for a molding machine promotes the production of more precise finished molded products, by providing proper heat management by keeping the thermal interference between neighboring ones of heating zones thereof as low as possible, as well as by keeping the thermal interference from outside sources as low as possible.

Figure 5:
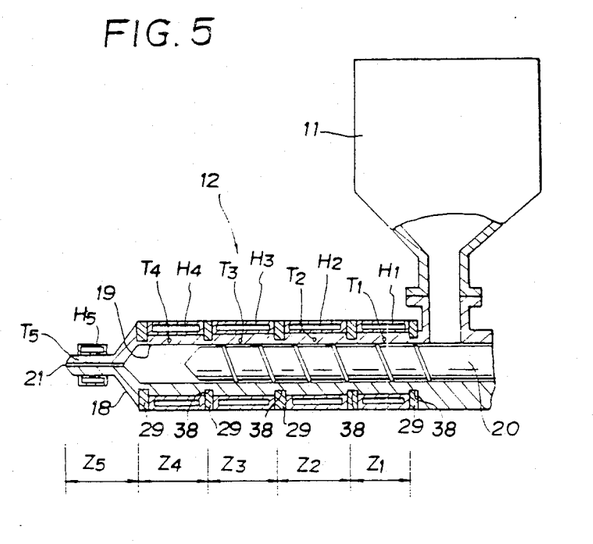
FIG. 5 is similar to FIG. 2, and shows a sectional view through a heating cylinder device, such as may be fitted to the injection molding machine of FIG. 1, according to a second preferred embodiment of the present invention, again taken in a sectional plane containing the axis of said heating cylinder device.

In FIG. 5, there is shown a sectional view of a heating cylinder device 12 according to the second preferred embodiment of the present invention, taken in a fashion similar to FIG. 2 in a sectional plane containing the axis of said heating cylinder device; in FIG. 5, reference symbols like to those of FIGS. 1 and 2 relating to the first preferred embodiment denote like parts and zones. This heating cylinder device 12 is for being fitted into an injection molding machine like the machine 10 shown in FIG. 1 relating to the first preferred embodiment, comprising a hopper for charging the resin, the heating cylinder device 12, a screw drive device for rotatively driving a screw piston 20 incorporated in said heating cylinder device 12 for injecting the molten resin, and a movable plate drive device for removing the molded products by opening and closing a metallic die which is mounted between a fixed plate and a laterally movable plate; this machine is not particularly shown in the figures, because its construction may be substantially identical to that of the FIG. 1 machine.

The heating cylinder device 12, in this second preferred embodiment, again is generally formed in a cylindrical shape with a central axial hole 19 formed through a cylinder wall portion 18, and with a screw piston 20 mentioned above fitted in said central axial hole 19, so as when rotated in a certain direction by the aforementioned screw drive device 13 to move to the left in the figure into said hole 19 so as to apply compression force to resin in said hole 19, and so as when rotated in the opposite direction to said certain direction to be moved to the right in the figure and to be withdrawn out of said hole 19. When said screw piston 20 is thus withdrawn from the hole 19 to a position beyond a certain position, resin charged in the hopper 11 can travel downwards into the hole 19 to recharge the heating cylinder device 12. A nozzle 21 is provided at the opposite end (the left end) of the heating cylinder device 12 from the hopper 11 (which is at the right end). Thus, as the screw piston 20 is alternately rotated in said certain direction and in the opposite direction to said certain direction, it is alternately forced into the hole 19 and withdrawn therefrom, thus alternately compressing resin in said hole 19 and forcing it out through the nozzle 21, and recharging said hole 19 with fresh resin from the hopper 11.

In the heating cylinder device 12, as before in the FIG. 2 device, there are altogether defined five heating zones, designated as Z1 through Z5, and axially spaced along the axis of said heating cylinder device 12 from the right to the left as seen in FIG. 5, i.e. from the end thereof at which the hopper 11 is provided to the end thereof at which the nozzle 21 is provided. Around each of these heating zones Z1 through Z5 there is fitted a corresponding heater H1 through H5, which is formed as a band extending right around the cylinder of the heating cylinder device 12, and in the inner wall portion of the heating cylinder device 12, in each of said heating zones Z1 through Z5, there is again fitted a corresponding thermocouple T1 through T5.

In detail, again, the first heating zone Z1 is the portion of the heating cylinder device 12 into which the resin is supplied from the hopper 11, and is heated by the heater H1 and is also water cooled so that the resin may be supplied from the hopper 11 without any risk of its surface being melted. And the thermocouple T1 detects the temperature in this first heating zone Z1. The second heating zone Z2 is a portion of the heating cylinder device 12 in which the resin is, next, heated up substantially only by the heater H2, and the thermocouple T2 detects the temperature in this second heating zone Z2. The third heating zone Z3 is a portion of the heating cylinder device 12 in which the resin is, next, heated up both by the heater H3 and by the frictional heat generated by the rotation of and by the compression effect generated by the screw piston 20; and the thermocouple T3 detects the temperature in this third heating zone Z3. The fourth heating zone Z4 is a reservoir in which the resin material to be injected is received for a certain time interval before being injected, and is required to be kept at a certain high temperature; in this portion of the heating cylinder device 12, the resin is heated up by the heater H4, and the thermocouple T4 detects the temperature in this fourth heating zone Z4. And the fifth heating zone Z5, which is just before the nozzle 21, is a portion of the heating cylinder device 12 in which the resin is particularly subject to disturbance of its temperature by external influences such as the heat capacity of the metallic die 16 and the atmosphere; and, in order to eliminate such external influencese, the resin in this fifth heating zone Z5 is kept hot by the heater H5, and the thermocouple T5 detects the temperature in this fifth heating zone Z5.

Now, particularly according to the particularly specialized inventive concept of this second preferred embodiment of the present invention, the wall portion 18 of the heating cylinder device 12 is structured, not as in the prior art described above as a uniform cylinder of the same inner and outer diameters along its longitudinal length, but with annular circumferentially extending grooves 38 spaced apart along its longitudinal length. However, in contrast to the first preferred embodiment described above, the outer diameters of the parts of the wall portion 18 of the heating cylinder device 12 which define the first heating zone Z1, the second heating zone Z2, the third heating zone Z3, and the fourth heating zone Z4 are all substantially the same; while as before the outer diameter of the wall portion 18 of the heating cylinder device 12 at the fifth heating zone Z5 is much smaller than at all the other heating zones Z1 through Z4. Thus, the portions of the wall portion 18 which define the heating zones Z1 through Z4 are each of approximately the same thickness, in this second preferred embodiment. However, by the provision of the annular grooves 38, the heat capacities of the portions of the wall portion 18 of the heating cylinder device 12 in between those portions thereof which define the first heating zone Z1, the second heating zone Z2, the third heating zone Z3, and the fourth heating zone Z4 are made to be very much lower than the heat capacities of said portions which define said heating zones Z1 through Z4, and further the heat transmission capacities of said in between portions are made to be very low; so that, substantially, the portions of the wall portion 18 of the heating cylinder device 12 in between those portions thereof which define the first heating zone Z1, the second heating zone Z2, the third heating zone Z3, and the fourth heating zone Z4 are thermally completely isolated from one another. This thermal isolation is further promoted by the further constructional detail that annular ring members 29 made of a thermally insulating material are fitted into the grooves 38, so as further to hamper thermal transfer by conduction across said grooves 38 between adjoining ones of the heating zones Z1 through Z4, and so as further to substantially prevent heat transfer by radiation and by convection between said heating zones Z1 through Z4. It should be noted, however, that these insulating annular ring members 29 are not strictly necessary for implementing the concept of this second preferred embodiment of the present invention, in its most basic form, and may be omitted in some cases.

This heating cylinder device 12 according to the second preferred embodiment of the present invention may be controlled by a control system similar to that described above with reference to FIGS. 3 and 4 with respect to the first preferred embodiment; details are omitted herein in the interests of brevity of description.

Although in the above FIG. 5 relating to this shown second preferred embodiment the widths of the grooves 38 are shown as being substantially the same, it would be possible to vary the widths of these grooves 38, as a further refinement of the inventive concept of said second preferred embodiment.

Thus, by providing the grooves 38 as thermally separating the heating zones Z1 through Z4 from one another, and optionally by further providing the insulating annular rings 29 as located therein, in addition to temperature controlling the respective heating zones Z1 through Z3, the influences of thermal interferences between the heating zones Z1 through Z4 may be largely eliminated, and fluctuations of the temperature of the resin which is to be forwarded to the fifth heating zone Z5 may be kept minimal.

Thus, also according to this second preferred embodiment of the present invention, there is provided a heating cylinder device for a molding machine which can keep the injection cycle of the machine short, thus improving the productivity of the machine and reduces the cost of operation and thus the cost of the finished products. Further, the power consumption is reduced as much as practicable, and the temperature control of the resin is improved, and the responsiveness of the temperature control is also improved. Thus, this heating cylinder device for a molding machine minimizes fluctuations in the system due to the motion of the resin material which is being heated up, changes in the temperature of the resin material, dissipation of heat in injecting the resin material, and so on. Thereby, this heating cylinder device for a molding machine promotes the production of more precise finished molded products, by providing proper heat management by keeping the thermal interference between neighboring ones of heating zones thereof as low as possible, as well as by keeping the thermal interference from outside sources as low as possible.

Figure 6:
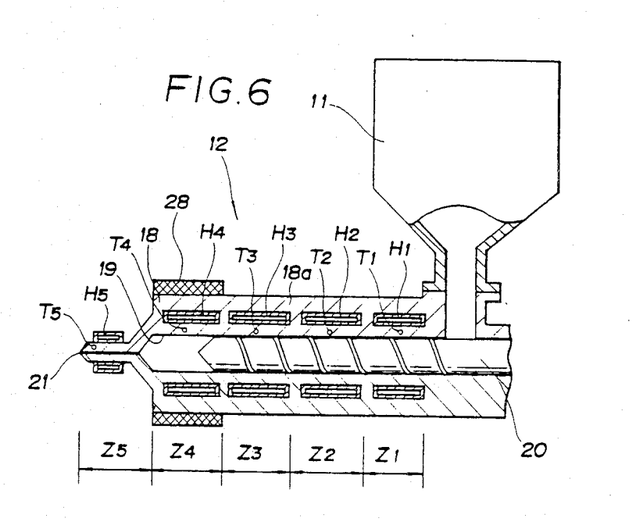
FIG. 6 is similar to FIGS. 2 and 5, and shows a sectional view through a heating cylinder device, such as may be fitted to the injection molding machine of FIG. 1, according to a third preferred embodiment of the present invention, again taken in a sectional plane containing the axis of said heating cylinder device.

In FIG. 6, there is shown a sectional view of a heating cylinder device 12 according to the third preferred embodiment of the present invention, taken in a fashion similar to FIGS. 2 and 5 in a sectional plane containing the axis of said heating cylinder device; in FIG. 6, reference symbols like to those of FIGS. 1 and 2 relating to the first preferred embodiment and FIG. 5 relating to the second preferred embodiment denote like parts and zones. This heating cylinder device 12 again is for being fitted into an injection molding machine like the machine 10 shown in FIG. 1 relating to the first preferred embodiment, comprising a hopper for charging the resin, the heating cylinder device 12, a screw drive device for rotatively driving a screw piston 20 incorporated in said heating cylinder device 12 for injecting the molten resin, and a movable plate drive device for removing the molded products by opening and closing a metallic die which is mounted between a fixed plate and a laterally movable plate; again, this machine is not particularly shown in the figures, because its construction may be substantially identical to that of the FIG. 1 machine.

The heating cylinder device 12, in this third preferred embodiment, again is generally formed in a cylindrical shape with a central axial hole 19 formed through a cylinder wall portion 18, and with a screw piston 20 mentioned above fitted in said central axial hole 19, so as when rotated in a certain direction by the aforementioned screw drive device 13 to move to the left in the figure into said hole 19 so as to apply compression force to resin in said hole 19, and so as when rotated in the opposite direction to said certain direction to be moved to the right in the figure and to be withdrawn out of said hole 19. When said screw piston 20 is thus withdrawn from the hole 19 to a position beyond a certain position, resin charged in the hopper 11 can travel downwards into the hole 19 to recharge the heating cylinder device 12. A nozzle 21 is provided at the opposite end (the left end) of the heating cylinder device 12 from the hopper 11 (which is at the right end). Thus, as the screw piston 20 is alternately rotated in said certain direction and in the opposite direction to said certain direction, it is alternately forced into the hole 19 and withdrawn therefrom, thus alternately compressing resin in said hole 19 and forcing it out through the nozzle 21, and recharging said hole 19 with fresh resin from the hopper 11.

In the heating cylinder device 12, as before in the FIG. 2 and FIG. 5 devices, there are altogether defined five heating zones, designated as Z1 through Z5, and axially spaced along the axis of said heating cylinder device 12 from the right to the left as seen in FIG. 6, i.e. from the end thereof at which the hopper 12 is provided to the end thereof at which the nozzle 21 is provided. Around each of these heating zones Z1 through Z5 there is fitted a corresponding heater H1 through H5, and in the inner wall portion of the heating cylinder device 12, in each of said heating zones Z1 through Z5, there is again fitted a corresponding thermocouple T1 through T5.

In detail, again, the first heating zone Z1 is the portion of the heating cylinder device 12 into which the resin is supplied from the hopper 11, and is heated by the heater H1 and is also water cooled so that the resin may be supplied from the hopper 11 without any risk of its surface being melted. And the thermocouple T1 detects the temperature in this first heating zone Z1. The second heating zone Z2 is a portion of the heating cylinder device 12 in which the resin is, next, heated up substantially only by the heater H2, and the thermocouple T2 detects the temperature in this second heating zone Z2. The third heating zone Z3 is a portion of the heating cylinder device 12 in which the resin is, next, heated up both by the heater H3 and by the frictional heat generated by the rotation of and by the compression effect generated by the screw piston 20; and the thermocouple T3 detects the temperature in this third heating zone Z3. The fourth heating zone Z4 is a reservoir in which the resin material to be injected is received for a certain time interval before being injected, and is required to be kept at a certain high temperature; in this portion of the heating cylinder device 12, the resin is heated up by the heater H4, and the thermocouple T4 detects the temperature in this fourth heating zone Z4. And the fifth heating zone Z5, which is just before the nozzle 21, is a portion of the heating cylinder device 12 in which the resin is particularly subject to disturbance of its temperature by external influences such as the heat capacity of the metallic die 16 and the atmosphere; and, in order to eliminate such external influencese, the resin in this fifth heating zone Z5 is kept hot by the heater H5, and the thermocouple T5 detects the temperature in this fifth heating zone Z5.

Now, as in the second preferred embodiment described above, the wall portion 18 of the heating cylinder device 12 is structured (however not with any annular circumferentially extending grooves spaced apart along its longitudinal length) with the outer diameters of the parts of the wall portion 18 of the heating cylinder device 12 which define the first heating zone Z1, the second heating zone Z2, the third zone Z3, and the fourth heating zone Z4 all being substantially the same; while as before the outer diameter of the wall portion 18 of the heating cylinder device 12 at the fifth heating zone Z5 is much smaller than at all the other heating zones Z1 through Z4. Thus, the portions of the wall portion 18 which define the heating zones Z1 through Z4 are each of approximately the same thickness, in this third preferred embodiment. However, particularly according to the particularly specialized inventive concept of this third preferred embodiment of the present invention, while the fifth heater H5 is as before formed as a band extending right around the cylinder of the heating cylinder device 12, the other four heaters H1 through H4, although still band shaped, are now buried deep within the wall portion 18 of said heating cylinder device 12. In other words, these heaters H1 through H4 are arranged to be as close in the radial direction to the interior hole 19 of the heating cylinder device 12 as possible, i.e. as close to the molten resin passing through said interior hole 19 as possible. A band 28 of insulating material is wrapped around the part of the wall portion 18 of the heating cylinder device 12 which defines the fourth heating zone Z4, for providing greater heat capacity and better insulating performance.

This heating cylinder device 12 according to the third preferred embodiment of the present invention may be controlled by a control system similar to that described above with reference to FIGS. 3 and 4 with respect to the first preferred embodiment; details are omitted herein in the interests of brevity of description.

Thus, by providing the heaters H1 through H4 as buried within the wall portion 18 of said heating cylinder device 12, and as close in the radial direction to the interior hole 19 of the heating cylinder device 12 as possible, i.e. as close to the molten resin passing through said interior hole 19 as possible, thermal transmission from said heaters H1 to H4 to the molten resin material is made as easy as practicable, and the responsiveness of the control system is improved, whereby fluctuations of the temperature of the resin which is to be forwarded to the fifth heating zone Z5 may be kept minimal.

Thus, also according to this third preferred embodiment of the present invention, there is provided a heating cylinder device for a molding machine which can keep the injection cycle of the machine short, thus improving the productivity of the machine and reduces the cost of operation and thus the cost of the finished products. Further, the power consumption is reduced as much as practicable, and the temperature control of the resin is improved, and the responsiveness of the temperature control is also improved. Thus, this heating cylinder device for a molding machine minimizes fluctuations in the system due to the motion of the resin material which is being heated up, changes in the temperature of the resin material, dissipation of heat in injecting the resin material, and so on. Thereby, this heating cylinder device for a molding machine promotes the production of more precise finished molded products, by providing proper heat management by keeping the thermal interference between neighboring ones of heating zones thereof as low as possible, as well as by keeping the thermal interference from outside sources as low as possible.

Figure 7:
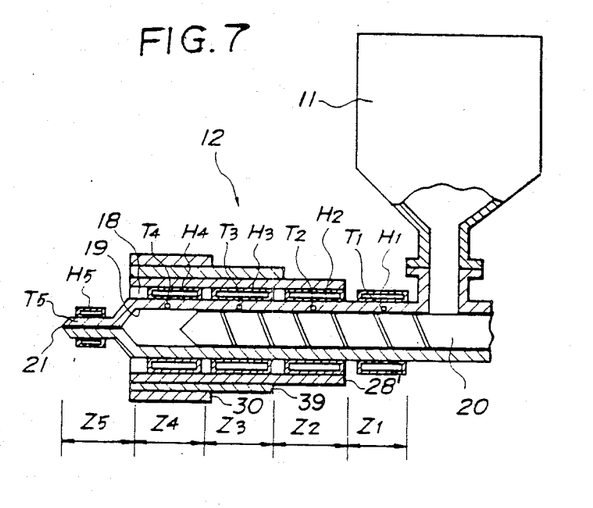
FIG. 7 is similar to FIGS. 2, 5, and 6, and shows a sectional view through a heating cylinder device, such as may be fitted to the injection molding machine of FIG. 1, according to a fourth preferred embodiment of the present invention, again taken in a sectional plane containing the axis of said heating cylinder device.

In FIG. 7, there is shown a sectional view of a heating cylinder device 12 according to the fourth preferred embodiment of the present invention, taken in a fashion similar to FIGS. 2, 5, and 6 in a sectional plane containing the axis of said heating cylinder device; in FIG. 7, reference symbols like to those of FIGS. 1 and 2 relating to the first preferred embodiment and FIGS. 5 and 6 relating to the second and third preferred embodiments denote like parts and zones. This heating cylinder device 12 again is for being fitted into an injection molding machine like the machine 10 shown in FIG. 1 relating to the first preferred embodiment, comprising a hopper for charging the resin, the heating cylinder device 12, a screw drive device for rotatively driving a screw piston 20 incorporated in said heating cylinder device 12 for injecting the molten resin, and a movable plate drive device for removing the molded products by opening and closing a metallic die which is mounted between a fixed plate and a laterally movable plate; again, this machine is not particularly shown in the figures, because its construction may be substantially identical to that of the FIG. 1 machine.

The heating cylinder device 12, in this fourth preferred embodiment, again is generally formed in a cylindrical shape with a central axial hole 19 formed through a cylinder wall portion 18, and with a screw piston 20 mentioned above fitted in said central axial hole 19, so as when rotated in a certain direction by the aforementioned screw drive device 13 to move to the left in the figure into said hole 19 so as to apply compression force to resin in said hole 19, and so as when rotated in the opposite direction to said certain direction to be moved to the right in the figure and to be withdrawn out of said hole 19. When said screw piston 20 is thus withdrawn from the hole 19 to a position beyond a certain position, resin charged in the hopper 11 can travel downwards into the hole 19 to recharge the heating cylinder device 12. A nozzle 21 is provided at the opposite end (the left end) of the heating cylinder device 12 from the hopper 11 (which is at the right end). Thus, as the screw piston 20 is alternately rotated in said certain direction and in the opposite direction to said certain direction, it is alternately forced into the hole 19 and withdrawn therefrom, thus alternately compressing resin in said hole 19 and forcing it out through the nozzle 21, and recharging said hole 19 with fresh resin from the hopper 11.

In the heating cylinder device 12, as before in the devices of FIGS. 2, 5, and 6, there are altogether defined five heating zones, designated as Z1 through Z5, and axially spaced along the axis of said heating cylinder device 12 from the right to the left as seen in FIG. 7, i.e. from the end thereof at which the hopper 12 is provided to the end thereof at which the nozzle 21 is provided. Around each of these heating zones Z1 through Z5 there is fitted a corresponding heater H1 through H5, and in the inner wall portion of the heating cylinder device 12, in each of said heating zones Z1 through Z5, there is again fitted a corresponding thermocouple T1 through T5.

In detail, yet again, the first heating zone Z1 is the portion of the heating cylinder device 12 into which the resin is supplied from the hopper 11, and is heated by the heater H1 and is also water cooled so that the resin may be supplied from the hopper 11 without any risk of its surface being melted. And the thermocouple T1 detects the temperature in this first heating zone Z1. The second heating zone Z2 is a portion of the heating cylinder device 12 in which the resin is, next, heated up substantially only by the heater H2, and the thermocouple T2 detects the temperature in this second heating zone Z2. The third heating zone Z3 is a portion of the heating cylinder device 12 in which the resin is, next, heated up both by the heater H3 and by the frictional heat generated by the rotation of and by the compression effect generated by the screw piston 20; and the thermocouple T3 detects the temperature in this third heating zone Z3. The fourth heating zone Z4 is a reservoir in which the resin material to be injected is received for a certain time interval before being injected, and is required to be kept at a certain high temperature; in this portion of the heating cylinder device 12, the resin is heated up by the heater H4, and the thermocouple T4 detects the temperature in this fourth heating zone Z4. And the fifth heating zone Z5, which is just before the nozzle 21, is a portion of the heating cylinder device 12 in which the resin is particularly subject to disturbance of its temperature by external influences such as the heat capacity of the metallic die 16 and the atmosphere; and, in order to eliminate such external influencese, the resin in this fifth heating zone Z5 is kept hot by the heater H5, and the thermocouple T5 detects the temperature in this fifth heating zone Z5.

Now, as in the second and third preferred embodiments described above, the wall portion 18 of the heating cylinder device 12 is structured (however not with any annular circumferentially extending grooves spaced apart along its longitudinal length) with the outer diameters of the parts of the wall portion 18 of the heating cylinder device 12 which define the first heating zone Z1, the second heating zone Z2, the third heating zone Z3, and the fourth heating zone Z4 all being substantially the same; while as before the outer diameter of the wall portion 18 of the heating cylinder device 12 at the fifth heating zone Z5 is much smaller than at all the other heating zones Z1 through Z4. Thus, the portions of the wall portion 18 which define the heating zones Z1 through Z4 are each of approximately the same thickness, in this fourth preferred embodiment. However, particularly according to the particularly specialized inventive concept of fourth preferred embodiment of the present invention, all of the first through the fifth heaters H1 through H5 are as in the first preferred embodiment of FIG. 2 formed as bands extending right around the cylinder of the heating cylinder device 12, so that the four heaters H1 through H4 are not buried deep within the wall portion 18 of said heating cylinder device 12, as was the case in the third preferred embodiment shown above; and around the first heater H1 there is provided no particular layer of insulating material, while around the second, third, and fourth heaters H2, H3, and H4 there is provided a first layer 28' of insulating material, around the third and fourth heaters H3 and H4 there is further provided a second layer 39 of insulating material on top of said first layer 28', and around the fourth heater H4, only, there is yet further provided a third layer 30 of insulating material on top of said first layer 28' and said second layer 39. And in the shown particular construction, although this is not intended to be limiting, all these layers 28', 29, and 30 of insulating material are of substantially the same thickness. A suitable material for use as this insulating material is glass wool. In other words, the first heater H1 for the first heating zone Z1 is not wrapped with any insulating material layer, the second heater H2 for the second heating zone Z2 is wrapped with one layer of insulating material, the third heater H3 for the third heating zone Z3 is wrapped with two layers of insulating material, and the heater H4 for the fourth heating zone Z4 is wrapped with three layers of insulating material, so that the thickness of the insulating material provided for each zone corresponds to the heat capacity required for that zone. I.e., the heat capacities of the various heating zones Z1 through Z4 are adapted to the respective temperatures at which they are required to operate. That is, the insulation is omitted in the case of the first and the fifth heating zones Z1 and Z5, in which it is required to transfer the controlled temperature of the respective heaters H1 and H5 to the resin material, so as to reduce their heat capacities, while on the other hand in the case of the fourth heating zone Z4, which is required to be maintained at a certain temperature, a thick layer of insulating material is provided, in order to make its heat capacity high; and the cases of the second and third heating zones Z2 and Z3 are intermediate between these two extremes.

This heating cylinder device 12 according to the fourth preferred embodiment of the present invention may be controlled by a control system similar to that described above with reference to FIGS. 3 and 4 with respect to the first preferred embodiment; details are again omitted herein in the interests of brevity of description.

Thus, by providing the layers of insulating material for the three heaters H2 through H4, and by determining the thicknesses of said layers in consideration of the heat capacities required for proper temperature control of the respective heating zones Z1 through Z5, or in other words by considering the responsiveness of the temperature control, in addition to temperature controlling the respective heating zones Z1 through Z5, the influences of thermal interferences between the heating zones Z1 through Z5 may be eliminated, and the responsiveness of the control system is improved, whereby fluctuations of the temperature of the resin which is to be forwarded to the fifth heating zone Z5 and to the nozzle 21 may be kept minimal.

Thus, also according to this fourth preferred embodiment of the present invention, there is provided a heating cylinder device for a molding machine which can keep the injection cycle of the machine short, thus improving the productivity of the machine and reduces the cost of operation and thus the cost of the finished products. Further, the power consumption is reduced as much as practicable, and the temperature control of the resin is improved, and the responsiveness of the temperature control is also improved. Thus, this heating cylinder device for a molding machine minimizes fluctuations in the system due to the motion of the resin material which is being heated up, changes in the temperature of the resin material, dissipation of heat in injecting the resin material, and so on. Thereby, this heating cylinder device for a molding machine promotes the production of more precise finished molded products, by providing proper heat management by keeping the thermal interference between neighboring ones of heating zones thereof as low as possible, as well as by keeping the thermal interference from outside sources as low as possible.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, although the various embodiments of the present invention which have been shown are all directed to its application to an injection molding machine, the present invention is not to be considered as limited to such an application. Therefore, it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A heating cylinder device for a molding machine, said device comprising a thermally conductive cylinder member including a central axial hole and a plurality of heating zones disposed axially along said cylinder member, each of said heating zones comprising a heater and means cooperating with said heater for individually controlling a temperature within a portion of said central axial hole disposed within a respective said heating zone to correspond to a predetermined temperature and operational performance desired for a respective said heating zone, the external diameter of said cylinder member containing said heating zones being stepwise varied to define said heating zones with each of said zones having a different external diameter for said cylinder member.

2. A heating cylinder device according to claim 1, wherein each of said heaters surrounds the portion of said cylinder member defining its said heating zone.

3. A heating cylinder device according to claim 1 or claim 2, wherein the portions of said cylinder member between its said portions defining said heating zones are substantially narrowed down as compared to its said portions defining said heating zones.

4. A heating cylinder device according to claim 3, wherein said portions of said cylinder member between its said portions defining said heating zones are formed as grooves between its said portions defining said heating zones.

5. A heating cylinder device according to claim 3, further comprising insulating members fitted over said portions of said cylinder member between its said portions defining said heating zones.

6. A heating cylinder device according to claim 1 or claim 2, wherein each of said heaters is buried in the portion of said cylinder member defining its said heating zone.

7. A heating cylinder device according to claim 1 or claim 2, further comprising a layer of insulating material surrounding one of said heating zones and said heater surrounding it.

8. A heating cylinder device according to claim 1 or claim 2, further comprising a plurality of layers of insulating material surrounding a plurality of said heating zones and said heaters surrounding them.

9. A heating cylinder device according to claim 8, wherein the layers of said insulating material surrounding different ones of said heating zones and said heaters are of different thicknesses.

10. A heating cylinder device according to claim 1, wherein said cylinder member has a material inlet end and a material outlet end, and the external diameter of said cylinder member progressively increases stepwise for a predetermined number of heating zones in a direction from said inlet end to said outlet end.

* * * * *